United States Patent [19]

Iacono et al.

[11] Patent Number: 5,746,550

[45] Date of Patent: May 5, 1998

[54] COUPLING REAMING APPARATUS AND METHOD

[75] Inventors: Vincent M. Iacono, Rock Hall, Md.; John R. Kimmich, Collegeville, Pa.; Keith L. Mayhood, Pittsburgh, Pa.; Walter B. Vogel, Brookhaven, Pa.; John J. McGettigan, Middletown Township, Delaware County, Pa.

[73] Assignee: Westinghouse Electric Corporation, Pittsburgh, Pa.

[21] Appl. No.: 549,382

[22] Filed: Oct. 27, 1995

[51] Int. Cl.$^6$ .............................. B23B 35/00; B23B 41/00
[52] U.S. Cl. .............................. 408/1 R; 408/79; 408/88; 408/237; 409/179
[58] Field of Search .............................. 408/79, 80, 88, 408/110, 236, 237, 1 R, 72 R; 409/175, 178, 179

[56] References Cited

U.S. PATENT DOCUMENTS

| | | | |
|---|---|---|---|
| 3,286,553 | 11/1966 | Spencer et al. | 409/178 |
| 3,603,204 | 9/1971 | Anderson, Sr. et al. | 409/179 |
| 3,617,142 | 11/1971 | De Wane | 409/175 |
| 4,011,024 | 3/1977 | Nakano et al. | 408/79 |
| 5,025,556 | 6/1991 | Stafford | 408/79 |

FOREIGN PATENT DOCUMENTS

| | | | |
|---|---|---|---|
| 390424 | 4/1923 | Germany. | |
| 2803563 | 8/1979 | Germany | 408/236 |
| 09696 | 8/1910 | United Kingdom. | |
| 1218908 | 1/1971 | United Kingdom. | |
| 9101837 | 2/1991 | WIPO. | |

*Primary Examiner*—Daniel W. Howell

[57] ABSTRACT

A compact coupling reaming apparatus and method for reaming coupling bolt holes of a rotor coupling. The apparatus includes a fixture plate for mounting the apparatus to the face of the coupling via a plurality of the coupling bolt holes. The apparatus also includes a drill axially slidably, radially slidably, and axially rotatably mounted to the fixture plate. During the reaming process, the drill is first aligned with the center of a first coupling bolt hole, the drill having a fixed distance from an axis of the rotor after being aligned with the center of the first coupling bolt hole. After reaming the first coupling bolt hole, the drill is aligned with a center of the holes and all other coupling bolt holes to be reamed by axially rotating the drill to the center of the second coupling bolt hole while maintaining the fixed distance of the drill from the axis of the rotor.

29 Claims, 8 Drawing Sheets

COUPLING REAMING APPARATUS AND METHOD

FIELD OF THE INVENTION

The present invention relates to a device and method for reaming holes in a coupling, in particular, for reaming holes of a turbine rotor or generator rotor coupling.

BACKGROUND OF THE INVENTION

In a turbine generator system, a turbine rotor is connected to generator rotor by a pair of couplings, one coupling for the turbine rotor and one coupling for the generator rotor. The turbine coupling is engaged to the generator coupling by a plurality of coupling bolts. The plurality of coupling bolts pass through and engage a plurality of coupling bolt holes in the outer diameters of each of the couplings.

In practice, a turbine coupling (and correspondingly, a generator coupling) may have 16 coupling bolt holes in its outer diameter. The initial diameter of a coupling bolt hole is at least 2 ¼ inches (5.7 cm) in some couplings. However, due to the torque placed on the coupling bolt holes during the operation of the turbine generator system, they generally get enlarged or distorted with time.

The connection between the turbine rotor and generator rotor, however, requires very strict tolerances. As a consequence, the coupling bolt holes are routinely reamed and the coupling bolts replaced with coupling bolts having a size corresponding to the new size of the reamed coupling bolt holes. For example, all the coupling bolt holes of the couplings may be enlarged 1/16 of an inch (0.16 cm) in diameter.

A post mill is commonly used to ream the coupling holes of a rotor coupling due to the size of the coupling bolt holes and the strict tolerances for rotor couplings. A post mill is an approximately 20 ton (18,140 kg) milling machine that requires a special truck and permit to move it to the location of a rotor coupling to be reamed. During the reaming process with the post mill, the mill is aligned with the center of each individual coupling bolt hole. Ideally, the distance from the center of each coupling bolt hole to the axis of turbine rotor or generator rotor should be identical. This helps balance the rotor and prevent any unnecessary torque on the shaft of the rotor due to the coupling between the rotors.

The reaming process performed with the post mill does not ensure that the distance from the center of each coupling bolt hole to the axis of turbine rotor or generator rotor is identical after the reaming of all the holes. For example, if a coupling bolt hole was initially bored slightly out of tolerance from the proper distance from the axis, the post mill will exacerbate the error. Thus, a need exists for a coupling bolt hole reaming apparatus which is compact and ensures that the distance from the center of each coupling bolt hole to the axis of turbine rotor or generator rotor is identical after the reaming of all the holes.

SUMMARY OF THE INVENTION

The present invention is a compact coupling bolt hole reaming machine and a method of reaming coupling bolt holes. In use, the machine is aligned with the axis of a rotor coupling whose bolt holes are to be reamed. A drill is then extended radially until it is aligned with a center of one of the plurality of coupling bolt holes. The bolt hole is reamed and then the drill is rotated circumreferentially about the axis of the rotor until it is aligned with the center of next coupling bolt hole to be reamed. Thus, the machine ensures that the distance from the center of each coupling bolt hole to the axis of turbine rotor or generator rotor is identical after each hole is reamed.

In one embodiment, the invention is a rack assembly for reaming coupling bolt holes of a coupling with a drill. The coupling has a first plurality of coupling bolt holes. The rack assembly has a fixture plate which mounts onto a face of the coupling via a second plurality of the first plurality of coupling bolt holes. The number of the first plurality of coupling bolt holes is greater than the number of the second plurality of coupling bolt holes. The rack assembly also has a drill mounting means for axially rotatably and radially slidably mounting the drill to the fixture plate.

In another embodiment, the invention is a coupling reaming apparatus for reaming coupling bolt holes of a coupling. The apparatus includes a drill for reaming coupling bolt holes. The apparatus also includes a drill mounting means for axially slidably, axially rotatably, and radially slidably mounting the drill to the fixture plate.

In either embodiment, the drill mounting means may include a geared bearing mounted on the fixture plate and a mounting plate mounted on the geared bearing. The drill mounting means may further include a worm gear assembly mounted onto the fixture plate, the worm gear assembly engaging gears of the geared bearing and axially rotating the mounting plate when operated. Finally, the drill mounting means may include a dovetail slide assembly to which the drill is radially slidable mounted and a mounting plate to which the dovetail slide assembly is axially rotatably mounted.

In another embodiment, the invention is a method of reaming a first plurality of coupling bolt holes on a face of a coupling of a rotor of a turbine generator system with a drill. First, the drill is aligned with a center of a first coupling bolt hole of the first plurality of coupling bolt holes. The drill has a fixed distance from an axis of the rotor after being aligned with the center of the first coupling bolt hole. Then, the first coupling bolt hole is reamed. After reaming the first hole, the drill is aligned with a center of a second coupling bolt hole of the first plurality of coupling bolt holes by axially rotating the drill to the center of the second coupling bolt hole while maintaining the fixed distance of the drill from the axis of the rotor. Finally, the second coupling bolt hole is reamed.

This embodiment of the invention may further include mounting a fixture plate onto the face of the coupling via a third plurality of the second plurality of coupling bolt holes, the number of the second plurality of coupling bolt holes being greater than the number of the third plurality of coupling bolt holes and axially slidably, axially rotatably, and radially slidably mounting the drill to the fixture plate.

BRIEF DESCRIPTION OF THE DRAWINGS

FIG. 5a is top view of an exemplary fixture plate of the present invention.

FIG. 5b is a side view of a cross section of the exemplary fixture plate shown in FIG. 5a.

DETAILED DESCRIPTION OF THE PREFERRED EMBODIMENTS

Figure 1:
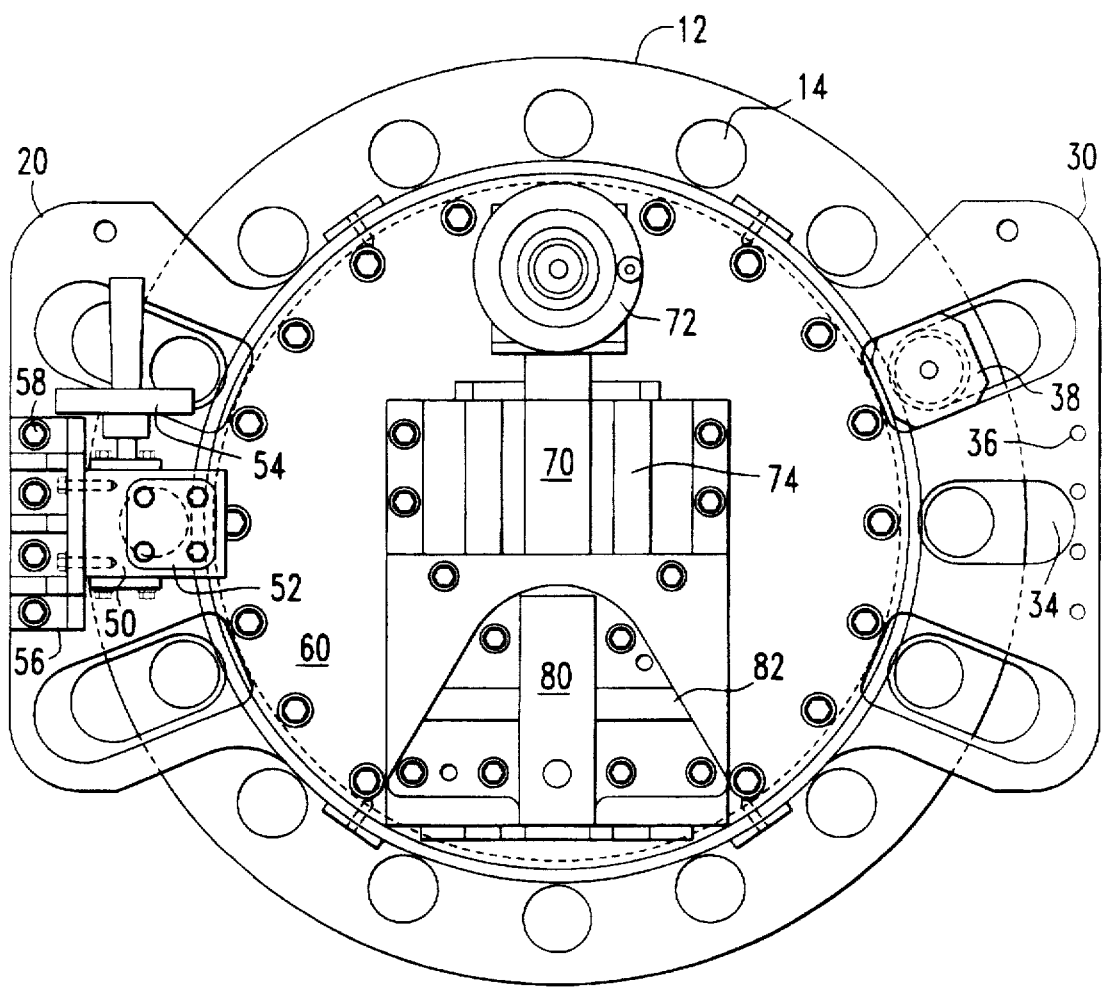
FIG. 1 is a top view of an exemplary rack assembly of the present invention mounted onto a coupling face of a rotor.

A preferred embodiment of the invention is presented with reference to FIG. 1. FIG. 1 depicts a rack assembly 20 of the present invention mounted onto a coupling face 12 of a rotor 10 (shown in FIG. 8). The rack assembly 20 includes a complete embodiment of a coupling reaming apparatus 100 (shown in FIG. 8) of the present invention except for a drill assembly 90 (shown in FIG. 8). The rack assembly 20 shown in FIG. 1 includes a fixture plate 30, T-bolt 38, geared bearing 40 (shown in FIG. 8), worm gear assembly 50, mounting plate 60, dovetail slide assembly 70, and feed assembly 80.

Figure 5:
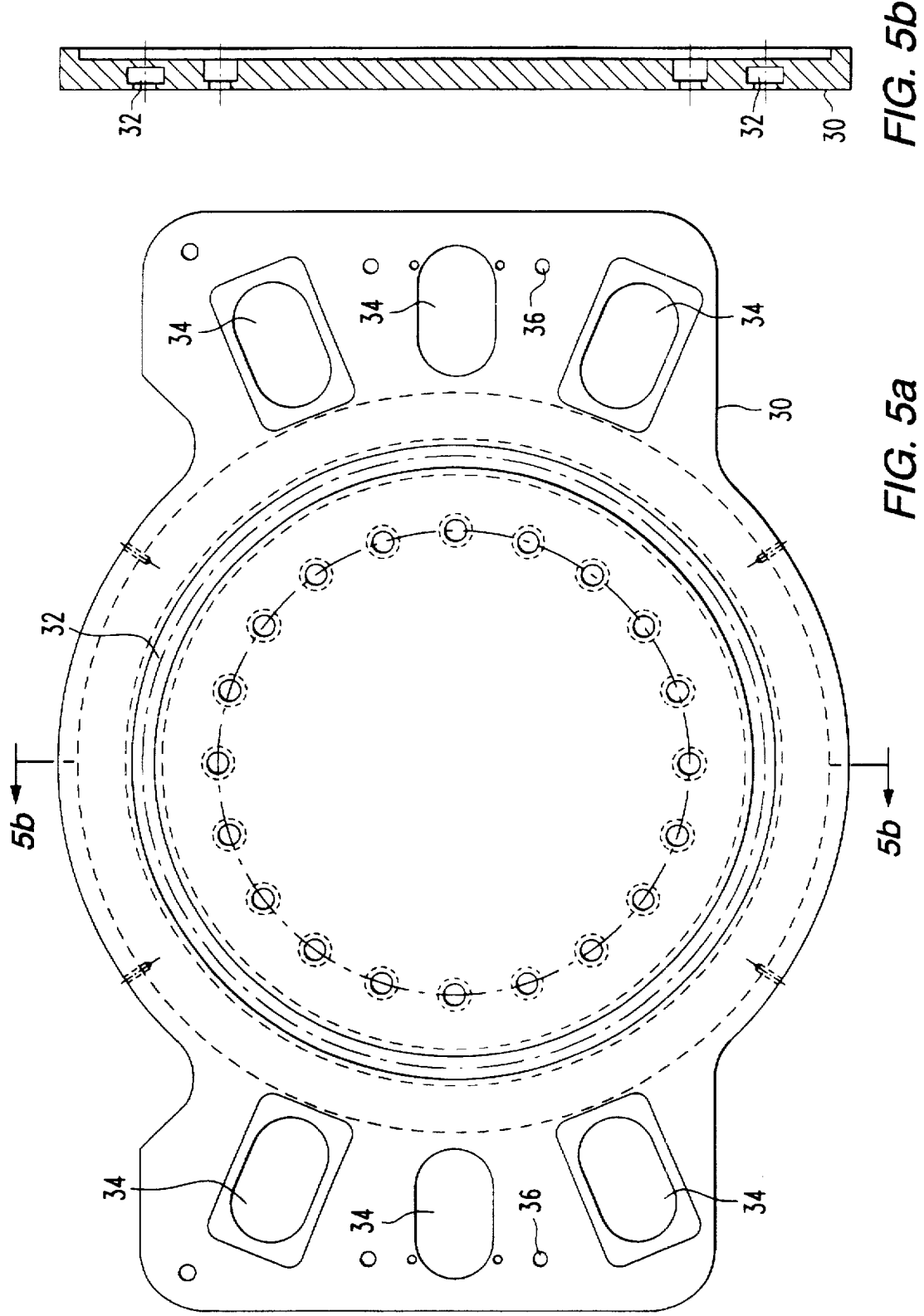

The fixture plate 30 includes female spigots 32 (shown in FIG. 5b), coupling mounting holes 34, and worm gear assembly bracket mounting holes 36. The worm gear assembly includes a worm gear reducer 52, a hand wheel 54, and a mounting bracket 56. The dovetail slide assembly 70 also includes a hand wheel 72. The feed assembly 80 includes a feed assembly rail 82. The drill assembly 90 mounts on the rail 82 and includes a commercial hydraulic drill 92, conventional reamer 94, and draw bar 96.

To ream a plurality of coupling bolt holes 14 using the preferred embodiment of the present invention, the rack assembly 20 is first mounted onto the coupling face 12 of the rotor 10 whose coupling bolt holes 14 are to be reamed. In the exemplary embodiment of the invention, the rack assembly 20 is mounted to the coupling face 12 by engaging at least three coupling mounting holes 34 of the fixture plate 30 to at least three coupling bolt holes 14 of the coupling face 12 via three T-bolts 38. At this point the center of the rack assembly 20 is aligned with the axis (of rotation) of the rotor 10.

Then, the drill assembly 90, more particularly, the reamer 94 of the assembly 90, is aligned with a center of coupling bolt hole 14 to be reamed. The reamer 94 is aligned by operating the two hand wheels, i.e., the hand wheel 72 for the dovetail slide assembly 70 and the hand wheel 54 for the worm gear assembly 50. Operating the handwheel 72 for dovetail slide assembly 70 moves the feed assembly 80 (and thus a drill assembly 90 attached thereto) radially toward and away from the axis of the rotor 10. Operating the hand wheel 54 for the worm gear assembly 50 moves the feed assembly 80 (and thus a drill assembly 90 attached thereto) axially around the circumference of a circle whose radius is set by the dovetail slide assembly 70. The hand wheels 72, and 54, are operated or manipulated until the drill is aligned with a first coupling hole 14 to be reamed.

Then, the drill assembly 90 attached to the fixture assembly 80 is moved axially toward and away from the coupling face 12 via the feed assembly rail 82. After the first coupling hole 14 is reamed, the drill assembly 90 attached to the fixture assembly 80 is positioned to the next hole 14 to be reamed. To position the drill assembly 90 attached to the fixture assembly 80 to the next hole 14, the hand wheel 54 for the worm gear assembly is operated to rotate the feed assembly and thus the drill assembly attached thereto axially around the circumference defined by the dovetail slide assembly 70 to the next hole. Note that the hand wheel 72 for dovetail slide assembly 70 is not operated to position the drill assembly 90 to the next hole to be reamed. As a consequence, the distance from the drill assembly 90 to the axis of the rotor coupling remains constant during the reaming of each subsequent hole. Thus, using the rack assembly 20 of the present invention, each hole 14 reamed after the first hole is reamed at the same distance from the axis of rotation of the rotor 10.

In order to ream a coupling bolt hole 14 which has a T-bolt 38 securing a fixture plate coupling mounting hole 34 thereto, a T-bolt 38 is placed in an adjacent or nearby coupling bolt hole 14 which has a mating fixture plate coupling mounting hole 34 disposed there over. Then, the T-bolt of the coupling bolt hole 14 is removed so that the hole 14 can be reamed. Finally, the worm gear assembly 50 of the present invention prevents the reaming of at least two of the coupling bolt holes 14 of the coupling face 12. In order to ream these holes 14, the worm gear assembly 50 is mounted on the opposite side of the fixture plate 30.

In FIG. 1, the worm gear assembly 50 is shown mounted on the left side of the fixture plate 30. The worm gear assembly 50 can be removed from the left side of the fixture plate 50 by removing the four bracket bolts 58 engaging the worm gear assembly bracket 56 to the fixture plate 30 via the four fixture plate bracket mounting holes 36. The worm gear assembly can then be mounted on the right side of the fixture plate by engaging the worm gear assembly bracket 56 to the right side of the fixture plate 30 via the four fixture plate bracket mounting holes 36 on the right side of the fixture plate 30. Then the coupling bolt holes 14 previously blocked by worm gear assembly 50 may be reamed (if there is a T-bolt 38 in any of these holes 14, the procedure described above is first followed prior to the reaming the hole 14).

Thus, using the rack assembly 20 of the present invention and a standard hydraulic drill assembly 90, the coupling bolt holes 14 of a coupling face 12 of a rotor 10 may be reamed. The rack assembly 20 of the present invention is light (approximately 800 lbs (363 kg)) so that the rack assembly may be easily transported to a site where the coupling bolt holes 14 of a coupling face 12 of a rotor 10 need to be reamed. In addition, the rack assembly 20 of the present invention ensures that each coupling bolt hole 14 is reamed at the same distance from the center or axis of rotation of the rotor 10.

Figure 2:
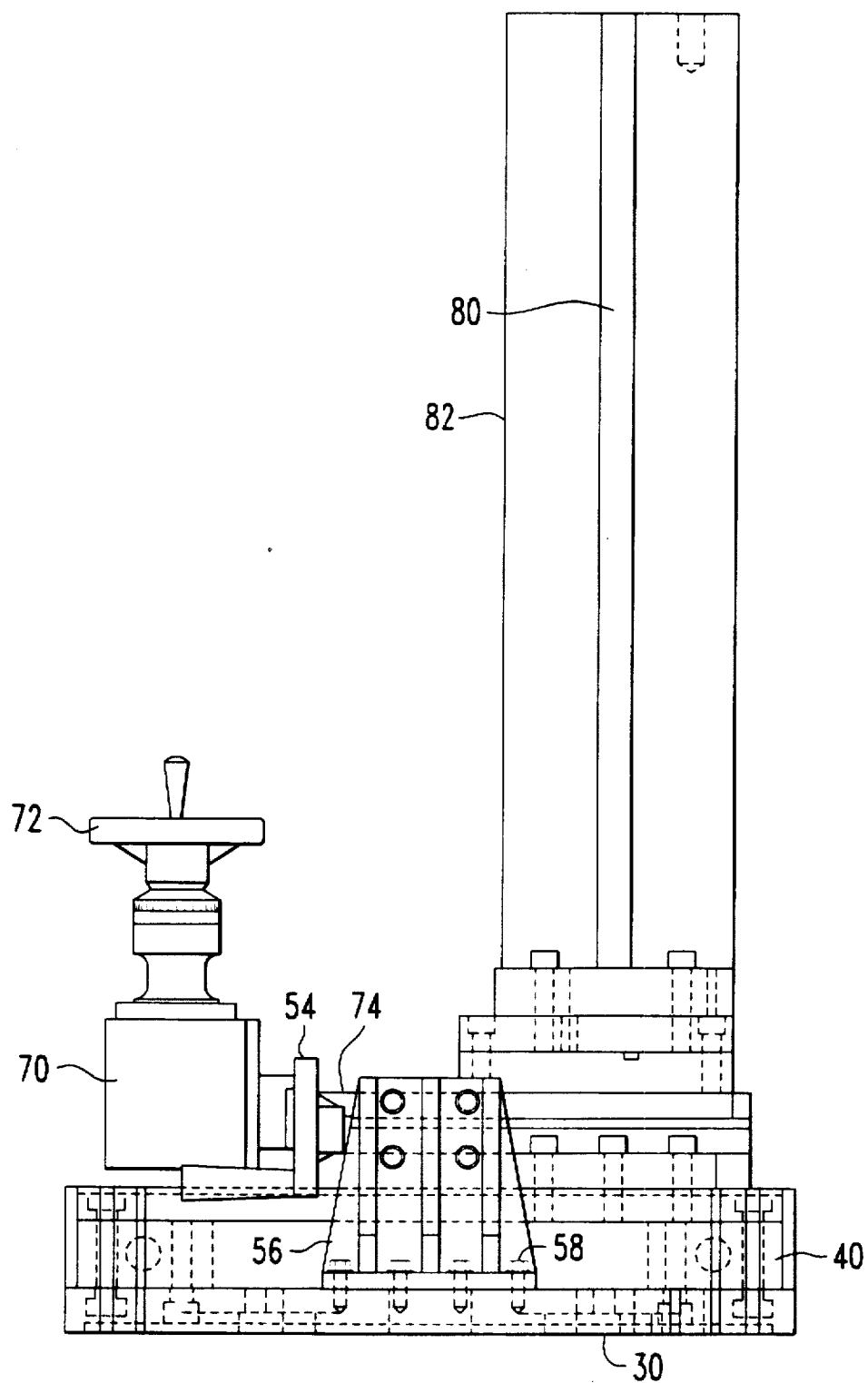
FIG. 2 is left side view of the exemplary rack assembly of the present invention shown in FIG. 1.

The rack assembly 20 of the present invention is described in more detail by reference to FIGS. 2–8. A left side view of the rack assembly 20 is shown in FIG. 2. As can be seen in this Figure, the feed assembly 80 extends perpendicular to fixture plate 30 and, thus, parallel to the axis of any rotor 10 to which the fixture plate 30 is attached. As noted above, the feed assembly 80 includes a rail 82 where the drill assembly 90 is attached. Since the rail 82 extends axially, the drill assembly 90 may be axially moved toward and away from a coupling face 12 and its coupling bolt holes 14 via the feed assembly 80.

The entire feed assembly 80 is attached to the dovetail slide assembly 70. By rotating the hand wheel 72 of the dovetail slide assembly 70, the feed assembly is moved along a slide assembly rail 74. The slide assembly rail 74 extends radially from the center of the mounting plate 60. The mounting plate 60 is set in the center of the fixture plate 60. Thus when the fixture plate is mounted on a coupling face 12 of a rotor 10, the slide assembly rail 74 will also extend radially from the axis of rotation of the rotor 10. As a consequence, when the hand wheel 72 of the dovetail slide assembly is rotated, the feed assembly 80 and thus a drill assembly 90 mounted thereon is moved radially to and from the axis of rotation of a rotor 10 to which the fixture plate 30 is mounted.

Figure 3:
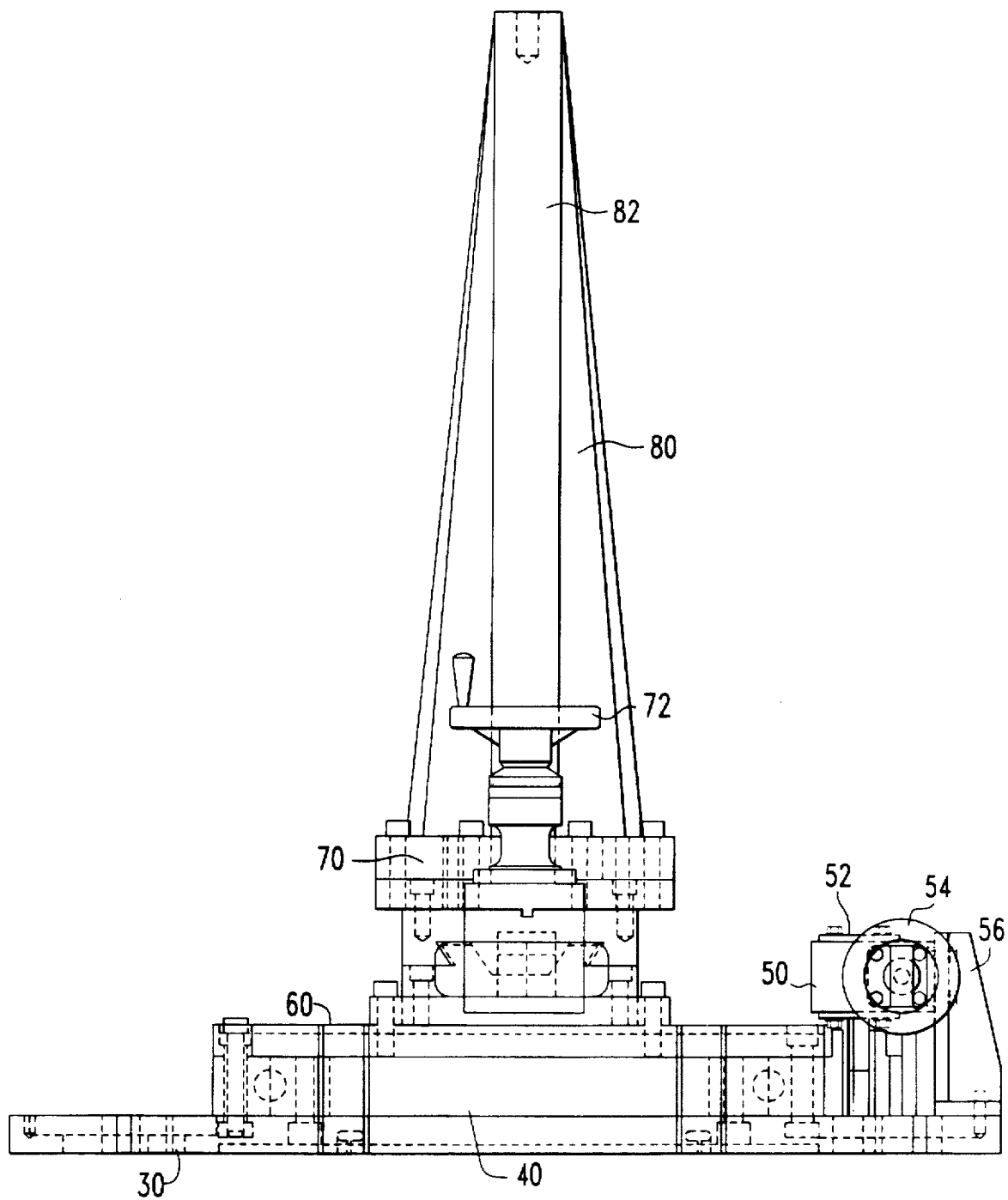
FIG. 3 is a top side view of the exemplary rack assembly of the present invention shown in FIG. 1.
Figure 4:
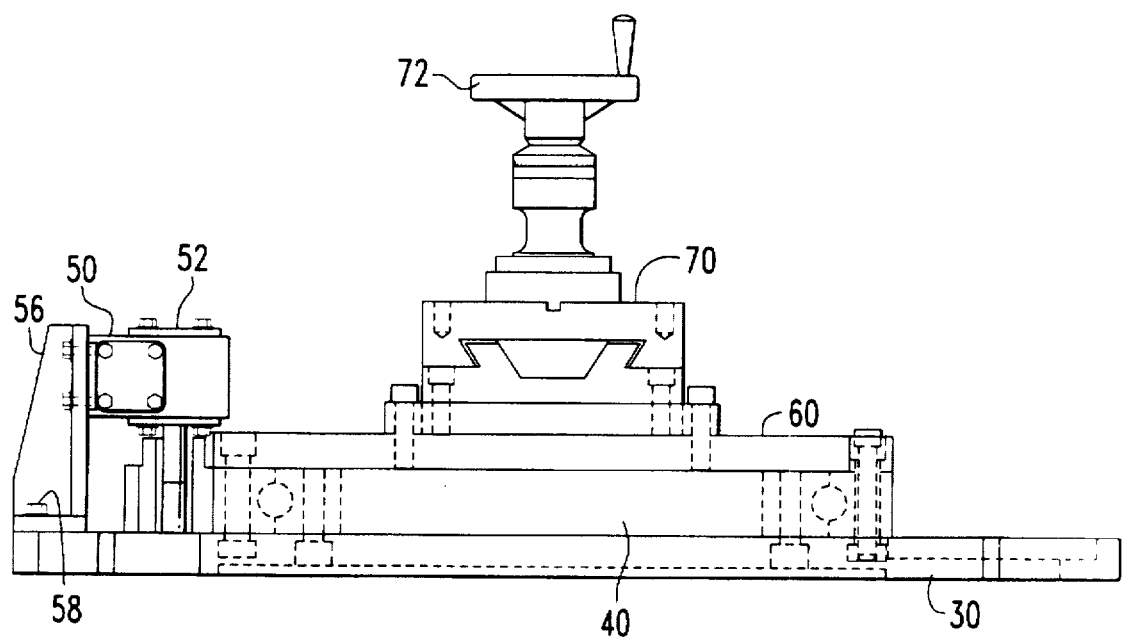
FIG. 4 is a partial bottom side view of the exemplary rack assembly of the present invention shown in FIG. 1.

A top side view of the rack assembly 20 is shown in FIG. 3 and a bottom side view of the rack assembly 20 (excluding the feed assembly 80) is shown in FIG. 4. As shown in these Figures, the dovetail slide assembly 70 is attached directly to the mounting plate 60 of the rack assembly 20. The mounting plate 60 is attached to the geared bearing 40 of the rack assembly 20. The geared bearing 40 and mounting plate are positioned in the center of the fixture plate 30. When the fixture plate 30 is mounted on a coupling face 12 of the rotor 10, the geared bearing 40 and mounting plate 40 are aligned with the axis of rotation of the rotor 10. The worm gear reducer 52 of the worm gear assembly 50 is coupled to gears of the geared bearing 40.

When the hand wheel 54 of the worm gear assembly 50 is rotated, the worm gear reducer 52 rotates the geared bearing 40 of the rack assembly 20 and thus the mounting plate 60 about the axis of rotation of a rotor 10 to which the fixture plate 30 is mounted. As noted above, the dovetail slide assembly 70 is attached to the mounting plate 60; thus, the dovetail slide assembly 70 is also rotated about the axis of rotation of rotor 10 to which the fixture plate 30 is mounted when the hand wheel 54 is rotated. The feed assembly 80 of the rack assembly 20 is attached to the dovetail slide assembly 70 and extends a fixed radial distance from the center of rotation or axis of the rotor 10. As a consequence, when the hand wheel 54 of the worm gear assembly 50 is rotated, the feed assembly 80 and thus a drill assembly 90 mounted thereon are rotated around the axis of rotation of the rotor 10 at a constant fixed distance (the radius from the center). Thus, the drill assembly 90 mounted on the feed assembly 90 forms a circle or follows a circumferential path when the hand wheel 54 is rotated where the radius of the circle or circumferential path is the distance from the drill assembly 90 to the axis of rotation of the rotor 10.

A top view of the fixture plate 30 of the rack assembly 20 is shown in FIG. 5a and a side view of a cross section of the fixture plate 30 of the rack assembly 20 is shown in FIG. 5b. As shown in FIG. 5a, the fixture 30 of the present invention has six coupling mounting holes 34. As noted above, in the preferred embodiment of the invention, a minimum of three coupling mounting holes 34 are used to mount the fixture plate 30 to the coupling face 12 of a rotor 10. Each coupling mounting hole 34 has an oblong shape which is formed by taking a circle of a fixed radius and dragging the circle a fixed distance away from the center of fixture plate 30 along a radial line extending from the center of the fixture plate 30.

In the preferred embodiment of the invention the fixed radius of the circle is approximately 1.75 inches (4.44 cm) and the center of the circle starts 11.75 inches (29.85 cm) from the center of the fixture plate and is moved to 14.00 inches (35.56 cm) from the axis to form the holes 34. Thus each of the coupling mounting holes 34 has a width of about 3.5 inches (8.9 cm), and a length of about 5.75 inches (14.6 cm). In the preferred embodiment of the invention, the diameter of the coupling bolt holes has a range from 2.25 inches (5.72 cm) (the initial size) to 3.5 inches (8.9 cm). In addition, the center of each coupling bolt hole extends from 11.75 inches (29.85 cm) to 14.0 inches (35.56 cm) from the axis of the rotor 10. As a consequence, the coupling mounting holes 34 can accommodate the various coupling bolt hole configurations for exemplary embodiments of rotors 10.

As shown in FIG. 5b, the fixture plate 30 includes a plurality of female spigots 32. The female spigots 32 are used to engage corresponding male spigots (not shown) on the coupling face 12 of the rotor 10. The female and male spigots simplify the mounting process of the fixture plate 30. The female spigots 32 of the fixture plate 30 are configured so that when they are engaged with the corresponding male spigots, the center of the fixture plate 30 is aligned with the axis of the rotor 10.

Figure 6:
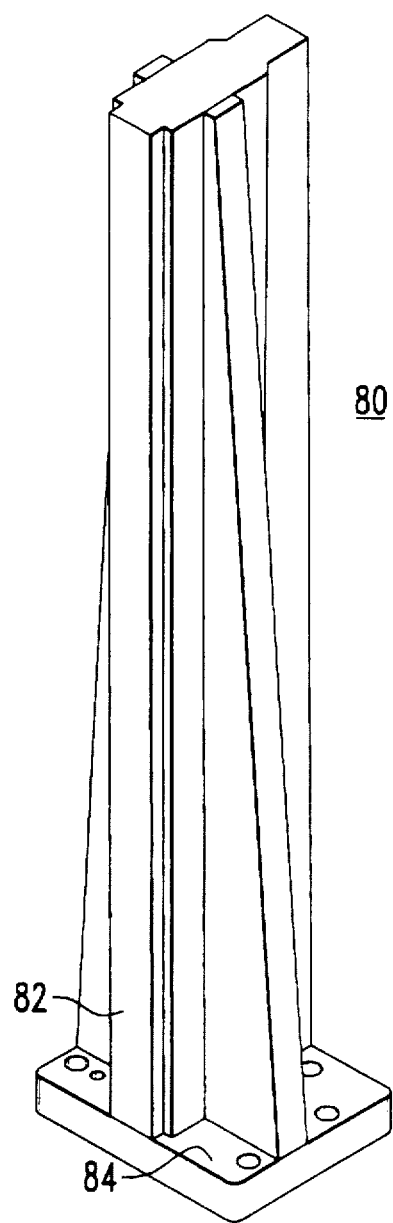
FIG. 6 is an isometric view of an exemplary feed assembly of the present invention.
Figure 7:
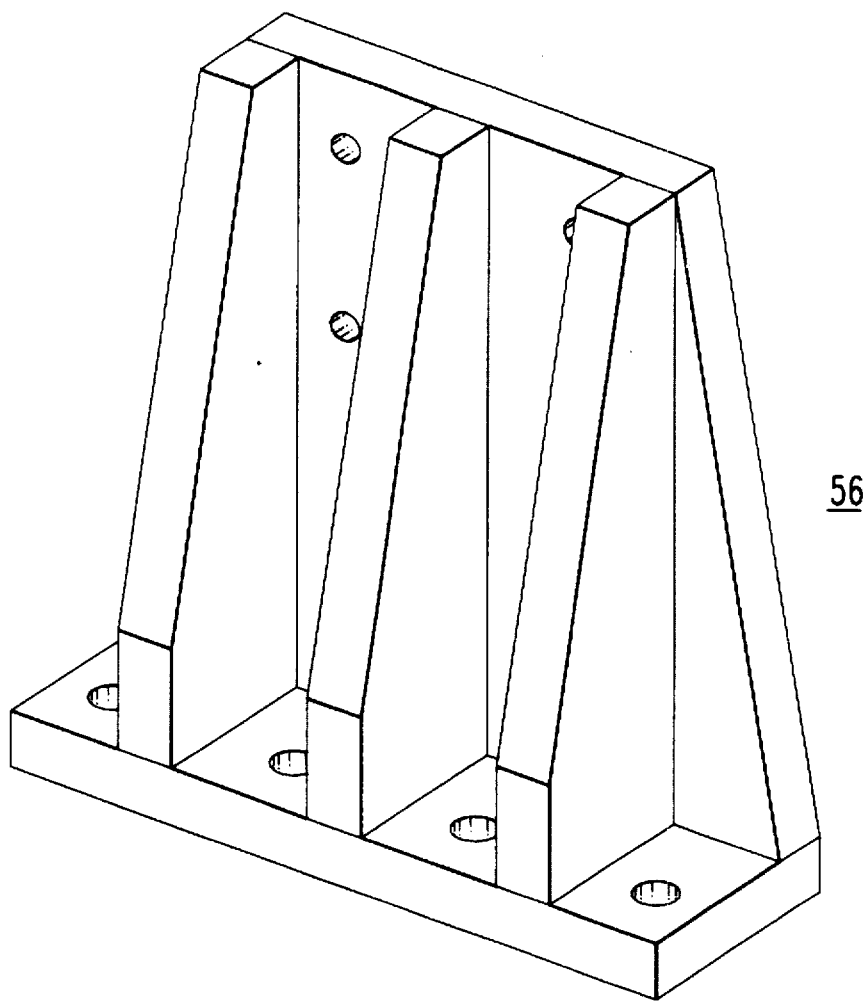
FIG. 7 is an isometric view of an exemplary worm gear assembly bracket of the present invention.

FIG. 6 is an isometric view of a feed assembly 80 of the present invention. As noted above, a drill assembly 90 is mounted onto the rail 82 of the feed assembly. The base 84 of the feed assembly 80 is mounted onto the rail 74 of the dovetail slide assembly 70. FIG. 7 is an isometric view of a mounting bracket 56 of the worm gear assembly 50. As noted above, the bracket is used to mount the worm gear reducer 52 and hand wheel 54 to the left or right side of the fixture plate 30. The bracket 56 is mounted to the fixture plate 30 via four bracket mounting bolts 58 which engage the four fixture plate bracket mounting holes 36 on either the left or right side of the fixture plate.

Figure 8:
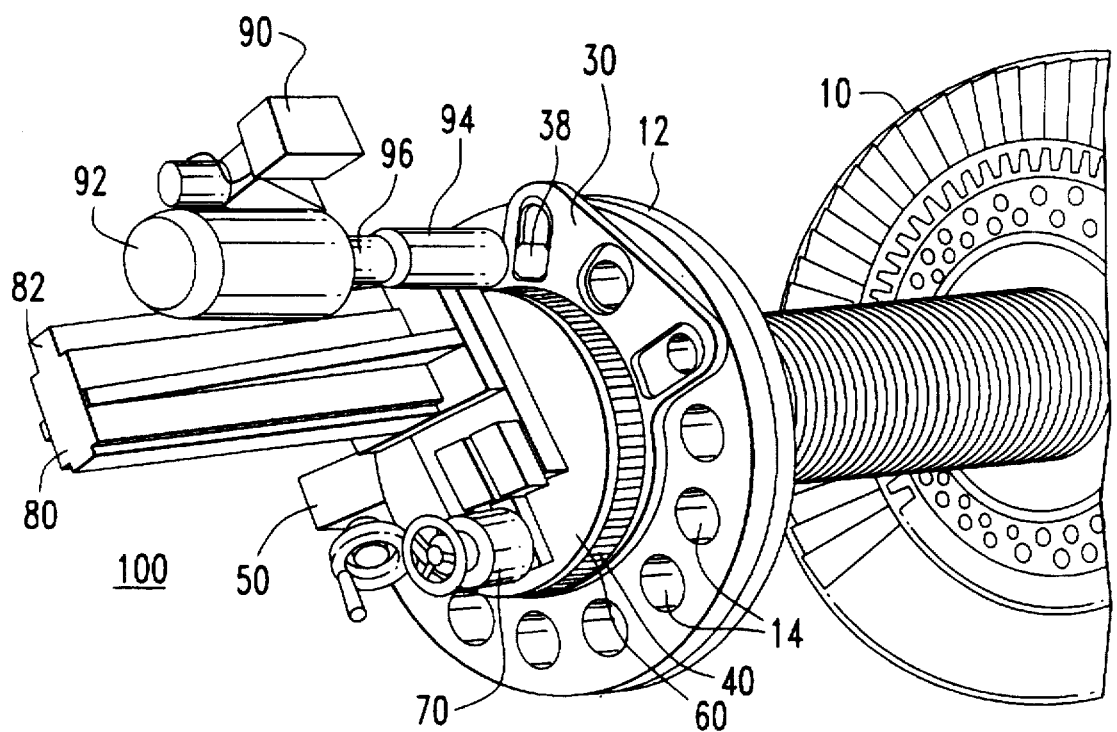
FIG. 8 is a photograph of an exemplary embodiment of the present invention mounted onto a coupling face of a turbine rotor.

FIG. 8 is a photograph of a coupling reaming apparatus 100 of the present invention mounted to the coupling face 12 of a turbine rotor 10. The coupling reaming apparatus 100 includes a commercial hydraulic drill 92, conventional reamer 94 and draw bar 96. The draw bar 96 connects the reamer 94 to the drill 92. The apparatus 100 also includes a feed assembly 80 with rail 82 where the drill 92 is mounted onto the rail 82 of the feed assembly. The apparatus 100 further includes a dovetail slide assembly 70, mounting plate 60, worm gear assembly 50, geared bearing 40, T-bolts 38, and fixture plate 30. The components of the apparatus 100 operate in the manner described above.

Although the invention has been described in terms of an exemplary embodiment, the spirit and scope of the appended claims are unlimited by any details not expressly stated in the claims. For example, for a different size coupling face or coupling bolt holes, other fixture plates may be made with coupling mounting holes corresponding to the position and size of the coupling bolt holes of the coupling face.

What is claimed is:

1. A rack assembly for reaming coupling bolt holes on a face of a coupling of rotor of a turbine generator system with a drill, the coupling having a first plurality of coupling bolt holes, the assembly comprising:

a fixture plate;

means for mounting the fixture plate onto the face of the coupling; and drill mounting means for rotatably and radially slidably mounting the drill to the fixture plate.

2. A rack assembly according to claim 1, wherein drill mounting means further includes means for axially slidably mounting the drill to the fixture plate.

3. A rack assembly according to claim 1, wherein the fixture plate includes a plurality of mounting holes to engage selected ones of the coupling bolt holes of the coupling.

4. A rack assembly according to claim 3, wherein the plurality of mounting holes is at least three holes.

5. A rack assembly according to claim 1, wherein the drill mounting means includes a geared bearing mounted on the fixture plate and a mounting plate mounted on the geared bearing.

6. A rack assembly according to claim 5, wherein the drill mounting means further includes a worm gear assembly mounted onto the fixture plate, the worm gear assembly engaging gears of the geared bearing and rotating the mounting plate when operated.

7. A rack assembly according to claim 6, wherein the drill mounting means further includes a dovetail slide assembly mounted on the mounting plate, the dovetail slide assembly operatively coupled to the drill and radially sliding the drill when operated.

8. A rack assembly according to claim 1, wherein the drill mounting means includes a dovetail slide assembly to which the drill is radially slidable mounted and a mounting plate to which the dovetail slide assembly is rotatably mounted.

9. A rack assembly according to claim 2, wherein the drill mounting means includes a geared bearing mounted on the fixture plate and a mounting plate mounted on the geared bearing and a worm gear assembly mounted onto the fixture plate, the worm gear assembly engaging gears of the geared bearing and rotating the mounting plate when operated.

10. A rack assembly according to claim 9, wherein the drill mounting means further includes a dovetail slide assembly mounted on the mounting plate and a feed assembly mounted on the dovetail slide assembly, the dovetail slide assembly radially sliding the feed assembly when operated and the drill axially slidably mounted onto the feed assembly.

11. A rack assembly according to claim 2, wherein the drill mounting means includes a feed assembly to which the drill is axially slidable mounted, a dovetail slide assembly to which the feed assembly is radially slidable mounted and a mounting plate to which the dovetail slide assembly is rotatably mounted.

12. A coupling reaming apparatus for reaming coupling bolt holes on a face of a coupling of rotor of a turbine generator system, the coupling having a first plurality of coupling bolt holes, the apparatus comprising:
 a fixture plate;
 means for mounting the fixture plate onto the face of the coupling;
 a drill for reaming coupling bolt holes; and
 drill mounting means for rotatably and radially slidably mounting the drill to the fixture plate.

13. A coupling reaming apparatus according to claim 12, wherein drill mounting means further includes means for axially slidably mounting the drill to the fixture plate.

14. A coupling reaming apparatus according to claim 12, wherein the fixture plate includes a plurality of mounting holes to engage selected ones of the coupling bolt holes of the coupling.

15. A coupling reaming apparatus according to claim 14, wherein the plurality of mounting holes is at least three holes.

16. A coupling reaming apparatus according to claim 12, wherein the drill mounting means includes a geared bearing mounted on the fixture plate and a mounting plate mounted on the geared bearing.

17. A coupling reaming apparatus according to claim 16, wherein the drill mounting means further includes a worm gear assembly mounted onto the fixture plate, the worm gear assembly engaging gears of the geared bearing and rotating the mounting plate when operated.

18. A coupling reaming apparatus according to claim 17, wherein the drill mounting means further includes a dovetail slide assembly mounted on the mounting plate, the dovetail slide assembly operatively coupled to the drill and radially sliding the drill when operated.

19. A coupling reaming apparatus according to claim 12, wherein the drill mounting means includes a dovetail slide assembly to which the drill is radially slidable mounted and a mounting plate to which the dovetail slide assembly is rotatably mounted.

20. A coupling reaming apparatus according to claim 13, wherein the drill mounting means includes a geared bearing mounted on the fixture plate and a mounting plate mounted on the geared bearing and a worm gear assembly mounted onto the fixture plate, the worm gear assembly engaging gears of the geared bearing and rotating the mounting plate when operated.

21. A coupling reaming apparatus according to claim 20, wherein the drill mounting means further includes a dovetail slide assembly mounted on the mounting plate and a feed assembly mounted on the dovetail slide assembly, the dovetail slide assembly radially sliding the feed assembly when operated and the drill slidably mounted onto the feed assembly.

22. A coupling reaming apparatus according to claim 13, wherein the drill mounting means includes a feed assembly to which the drill is axially slidable mounted, a dovetail slide assembly to which the feed assembly is radially slidable mounted and a mounting plate to which the dovetail slide assembly is rotatably mounted.

23. A method of reaming a first plurality of coupling bolt holes on a face of a coupling of rotor of a turbine generator system with a drill, comprising the steps of:
 a) mounting a fixture plate onto the coupling;
 b) axially slidably, rotatably, and radially slidably mounting the drill to the fixture plate;
 c) aligning the drill with a center of a first coupling bolt hole of the first plurality of coupling bolt holes, the drill having a fixed distance from an axis of the rotor after being aligned with the center of the first coupling bolt hole;
 d) after step c), reaming the first coupling bolt hole;
 e) after step d), aligning the drill with a center of a second coupling bolt hole of the first plurality of coupling bolt holes by rotating the drill to the center of the second coupling bolt hole while maintaining the fixed distance of the drill from the axis of the rotor; and
 f) after step e), reaming the second coupling bolt hole.

24. A method of according to claim 23, further comprising the step of:
 i) axially slidably, rotatably, and radially slidably mounting the drill to the face of the coupling.

25. A method according to claim 23 wherein step b) further includes the step of using a geared bearing mounted on the fixture plate, a mounting plate mounted on the geared bearing, and a worm gear assembly mounted onto the fixture plate to rotatably mount the drill to the fixture plate, the mounting plate operatively coupled to the drill and the worm gear assembly engaging gears of the geared bearing; and
 wherein step c) includes the step of rotating the mounting plate.

26. A method according to claim 23 wherein step b) further includes the step of using a dovetail slide assembly operatively coupled to the fixture plate and drill to radially slidably mount the drill to the fixture plate; and
 wherein step c) includes the step of using the dovetail slide assembly to radially slide the drill.

27. A method according to claim 23 wherein step b) further includes the step of using a feed assembly operatively coupled to the fixture plate and drill to axially slidably mount the drill to the fixture plate.

28. A method according to claim 23 wherein step b) further includes the step of using a geared bearing mounted on the fixture plate, a mounting plate mounted on the geared bearing, a worm gear assembly mounted onto the fixture plate, and a dovetail slide assembly operatively coupled to the mounting plate and the drill to rotatably and radially slidably mount the drill to the fixture plate, the worm gear assembly engaging gears of the geared bearing; and wherein step c) includes the steps of rotating the mounting plate; and using the dovetail slide assembly to radially slide the drill.

29. A method according to claim 23 wherein step b) further includes the step of using a geared bearing mounted on the fixture plate, a mounting plate mounted on the geared bearing, a worm gear assembly mounted onto the fixture plate, a dovetail slide assembly operatively coupled to the mounting plate, and a feed assembly operatively coupled to the dovetail slide assembly and the drill to rotatably, radially slidably, and axially slidably mount the drill to the fixture plate, the worm gear assembly engaging gears of the geared bearing; and wherein step c) includes the steps of rotating the mounting plate; and using the dovetail slide assembly to radially slide the feed assembly.

* * * * *